No. 701,876. Patented June 10, 1902.
F. W. GORDON.
VARIABLE SPEED GEARING.
(Application filed Feb. 26, 1902.)
(No Model.) 2 Sheets—Sheet 1.
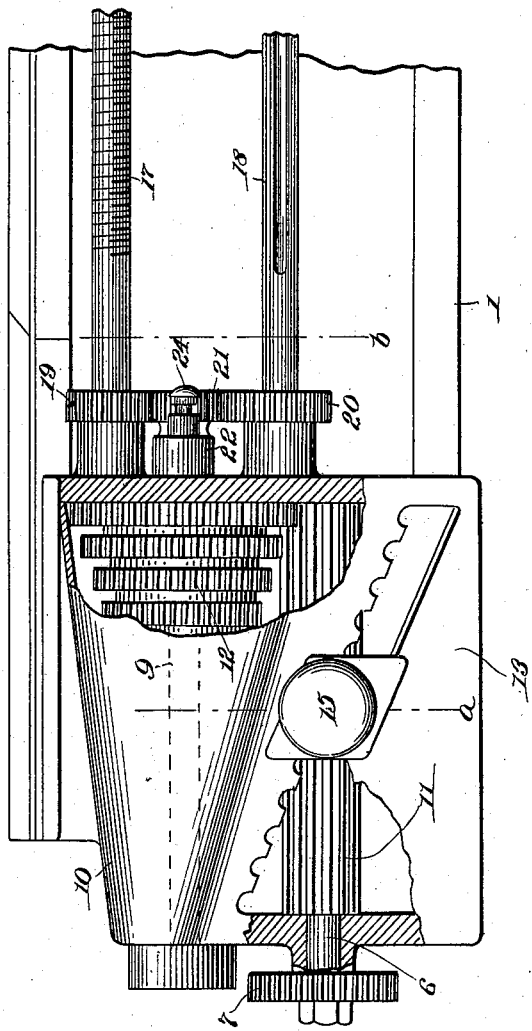

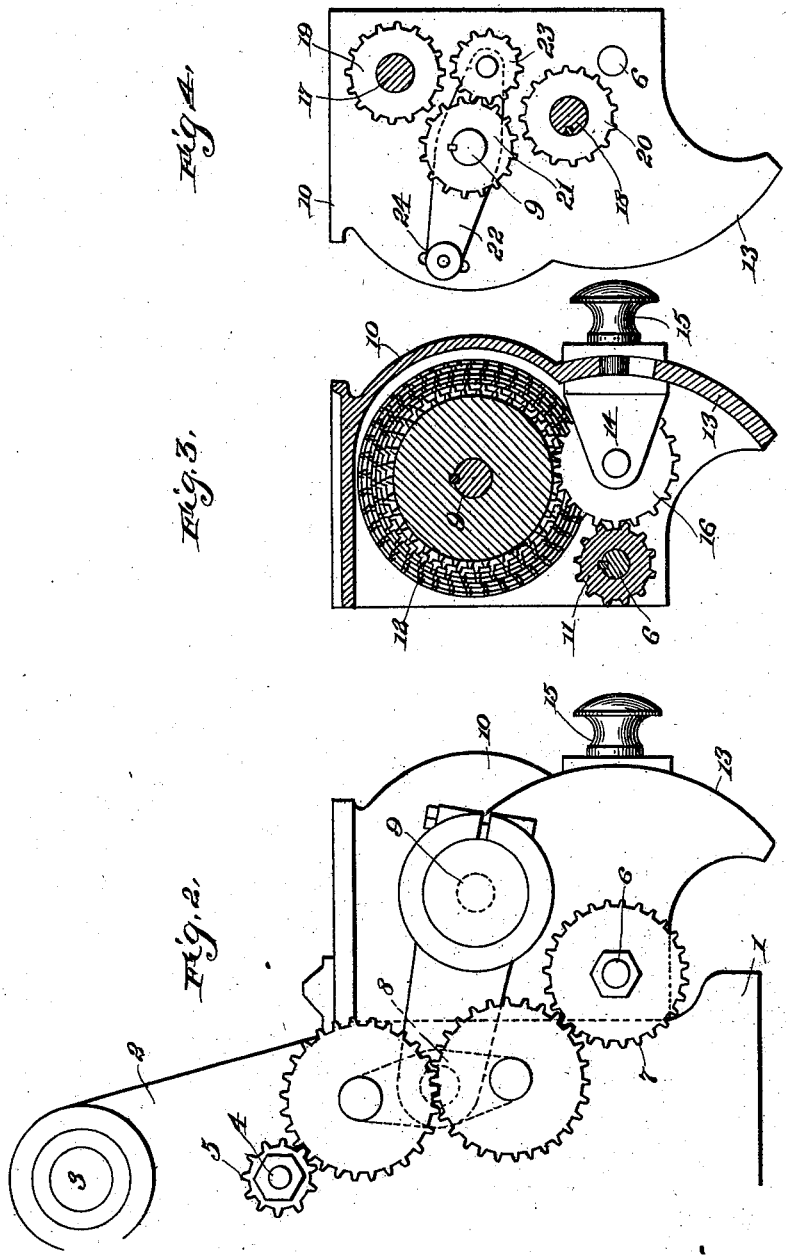

UNITED STATES PATENT OFFICE.

FREDERICK W. GORDON, OF HARTFORD, CONNECTICUT, ASSIGNOR TO PRATT & WHITNEY COMPANY, OF HARTFORD, CONNECTICUT.

VARIABLE-SPEED GEARING.

SPECIFICATION forming part of Letters Patent No. 701,876, dated June 10, 1902.

Application filed February 26, 1902. Serial No. 95,820. (No model.)

*To all whom it may concern:*

Be it known that I, FREDERICK W. GORDON, a citizen of the United States, residing at Hartford, Hartford county, Connecticut, (post-office address, care Pratt & Whitney Company, Hartford, Connecticut,) have invented certain new and useful Improvements in Variable-Speed Gearing, of which the following is a specification.

This invention pertains to a system of gearing for transmitting motion from a driving-shaft rotating at uniform rate to one or more driven shafts at variable rate. The system is applicable to many situations in machine construction, and I have thought best to illustrate it in connection with the driving of the feed devices of an engine-lathe.

The invention will be readily understood from the following description, taken in connection with the accompanying drawings, in which—

Figure 1 is a front elevation of a portion of an engine-lathe provided with gearing exemplifying my invention, a portion of the casing of the gearing being broken away to exhibit the interior parts; Fig. 2, an end elevation of the mechanism as viewed from the left hand of Fig. 1; Fig. 3, a vertical transverse section taken in the plane of line *a* of Fig. 1 and viewed from the left of that plane; and Fig. 4, an end elevation as viewed from the right in Fig. 1, parts appearing in vertical transverse section in the plane of line *b* of Fig. 1.

In the drawings, 1 indicates the bed of an ordinary engine-lathe; 2, the head-stock of the lathe; 3, the lathe-arbor; 4, the usual change-gear spindle taking its motion from the arbor; 5, the usual change-gear thereon; 6, a shaft supported by the bed parallel with the lathe-arbor; 7, a change-gear on shaft 6; 8, intermediate gear mechanism in the train of change-gears to cause gear 5 to transmit motion to gear 7; 9, a shaft supported by the bed parallel with and near shaft 6; 10, a casing inclosing the general gearing and secured to the lathe-bed and furnishing the protecting and supporting housing for certain gears and their shafts; 11, a long pinion or gear fast on shaft 6; 12, a series of dissimilar-sized gears fast on shaft 9, these gears having a pitch the same as that of long gear 11, the length of the latter being substantially equal to the length of the series of gears 12, which gears 12 will hereinafter be referred to as the "cone-gears," the preferable arrangement being that these gears be arranged in step-like succession; 13, a wall of casing 10, arranged concentric with shaft 6 and provided with an oblique longitudinal slot; 14, a bracket seated against the inner surface of concentric wall 13 and adapted for longitudinal and circumferential adjustment upon said wall; 15, a clamp engaging the bracket 14 and the slot in wall 13 and serving to clamp the bracket in adjusted position upon the wall; 16, an idle gear carried by bracket 14 and constantly engaging long pinion 11 and adapted by the adjustment of the bracket to be put into engagement with any selected one of cone-gears 12; 17, the lead-screw of the lathe, having its head end journaled near and preferably in the head of casing 10; 18, the usual splined feed-rod of the lathe, having its head end journaled near and preferably in the head-casing 10; 19, a gear fast on lead-screw 17; 20, a gear fast on splined rod 18 and disposed in the plane of gear 19; 21, a gear fast on the inner end of shaft 9, which carries cone-gears 12, this gear 21 being in the plane of gears 19 and 20, but free of engagement with them; 22, a rocking tumbler with its pivot-axis coinciding with shaft 9; 23, a gear carried by this tumbler and constantly engaging gear 21, and adapted by the adjustment of the tumbler to be thrown into engagement with either gear 19 or 20, and 24 a detent for locking tumbler 22 in its neutral or either of its extreme positions.

The change-gear train transmits motion from spindle 4 to shaft 6 after the usual manner in which the change-gearing transmits motion from the spindle to the lead-screw as engine-lathes are generally arranged, and in the present case the change-gear system, so far as its changeability is concerned, may be ignored, as its changeability becomes of utility only when it becomes necessary to exceed the range of feed variations obtainable from the other features of the present mechanism. Shaft 6 may therefore be looked upon as a shaft turning continuously at constant rate in unison with the lathe-arbor. By appropriately adjusting bracket 14 idle gear 16 constantly driven by long pinion 11, may be caused to mesh with any selected one of cone-gears 12, the device thus providing for the transmission of selective speeds to shaft 9 from the uniformly-rotating shaft 6. With tumbler 22 in the position indicated in Fig. 4 the turning of shaft 9 is without effect; but if tumbler 22 be so adjusted as to put gear 23 into mesh with gear 19 then shaft 9 transmits motion to the lead-screw, and at such rate relative to that of shaft 6 as is determined by the selected cone-gear. Variable motion may thus be given to the lead-screw from the uniformly-rotating lathe-arbor, thus providing for various pitches of screws to be cut by the lathe. If tumbler 22 be so adjusted as to put gear 23 into mesh with gear 20, then motion becomes transmitted to the splined feed-rod at a rate relative to that of shaft 6 dependent on the selected cone-gear. Provision is thus made for getting selective speeds to either the lead-screw or the feed-rod from the uniformly-rotating lathe-arbor.

Considered as a device for transmitting the feeding motion in an engine-lathe the described provisions indicate about all of its useful capacities, it being understood, of course, that if the range of variation in speeds obtainable from the cone-gears is insufficient then recourse may be had to the train of change-gears by the usual transposition, substitution, &c.; but the transmission of feed-motion in a lathe is but a single example of the applicability of the present system, and it is obvious that shaft 6 may be viewed broadly as a uniformly-rotating driver, which by means of the present system of gearing may be caused to transmit rotation at selective speeds to shaft 9 as a driven shaft or beyond that to either of two selective shafts represented by lead-screw 17 and feed-rod 18. Conversely, shaft 9 may be viewed as a uniformly-rotating driving-shaft from which the system of gearing permits rotation at selected rate to be transmitted to shaft 6 as a driven shaft, and instead of viewing shaft 9 as the driving shaft it may be viewed as an intermediate shaft, deriving motion either from gear 19 or gear 20, selectively, under which circumstances it is manifest that shaft 6 when viewed as a driven shaft may receive rotation at selected rate from either gear 19 or gear 20.

I claim as my invention—

1. In variable-speed gearing, the combination, substantially as set forth, of a first shaft, a shaft parallel therewith, a series of dissimilar-sized gears fast on the first shaft, a gear fast on the second shaft having a length equal to the length of the series of gears on the first shaft, a slotted wall-like support disposed concentric and parallel with said second shaft, a bracket seated upon the inner surface of said support and longitudinally and angularly adjustable upon the inner surface of said support, and a gear carried by said bracket and constantly engaging said long gear and adapted for engagement with any of said dissimilar-sized gears.

2. In variable-speed gearing, the combination, substantially as set forth, of two parallel shafts, selective gearing connecting said two shafts and adapted to serve in transmitting motion from one to the other at selective speeds, a third shaft and a fourth shaft arranged parallel with each other and with their axes parallel with those of the first-mentioned shafts, a gear on the third shaft, a gear on the fourth shaft in the plane of the one on the third shaft, a gear on one of said first-mentioned shafts in the plane of those on the third and fourth shafts but free of engagement therewith, a rocking tumbler, and a gear carried by said tumbler and constantly engaging the last-mentioned gear and adapted to engage the gear on the third shaft or the gear on the fourth shaft.

FREDERICK W. GORDON.

Witnesses:
W. M. STORRS,
CHAS. S. MUNGER.